United States Patent

Irimajiri et al.

[11] 4,020,455
[45] Apr. 26, 1977

[54] DECELERATION DETECTOR SYSTEM FOR MOTOR VEHICLES WITH AUTOMATIC TRANSMISSION

[75] Inventors: Shoichiro Irimajiri, Kawagoe; Yoshio Tanaka, Tokyo; Atsushi Kobayashi, Asaka, all of Japan

[73] Assignee: Honda Giken Kogyo Kabushiki Kaisha, Tokyo, Japan

[22] Filed: July 24, 1975

[21] Appl. No.: 598,863

[30] Foreign Application Priority Data

Aug. 2, 1974    Japan ............................. 49-87990

[52] U.S. Cl. .............................. 340/53; 307/10 R; 123/117 R
[51] Int. Cl.[2] .......................................... F02P 5/04
[58] Field of Search ............ 340/52 R, 53, 62, 66, 340/69; 307/10 R; 123/198 D, 198 DC, 117 R, 146.5 A

[56] References Cited

UNITED STATES PATENTS

| | | | |
|---|---|---|---|
| 2,621,265 | 12/1952 | Alcoriza | 340/69 |
| 3,215,979 | 11/1965 | Ryan | 340/66 |
| 3,620,324 | 11/1971 | Smitley | 123/198 DC |
| 3,626,455 | 12/1971 | Toda, et al. | 74/860 |
| 3,779,219 | 12/1973 | Saita | 123/117 R |

*Primary Examiner*—John W. Caldwell
*Assistant Examiner*—Joseph E. Nowicki
*Attorney, Agent, or Firm*—Lyon & Lyon

[57] ABSTRACT

Apparatus to detect deceleration of a motor vehicle having an automatic transmission includes a first electrical switch operated by release of pressure from the accelerator pedal and a second electrical switch operated by application of pressure to the brake pedal. A detector device having an output signal is connected in parallel with the electric switches. The output signal of the detector device is employed to vary the spark timing of an internal combustion engine. In a modification, the electric switches are connected in series.

3 Claims, 3 Drawing Figures

DECELERATION DETECTOR SYSTEM FOR MOTOR VEHICLES WITH AUTOMATIC TRANSMISSION

This invention relates to automobiles and other engine-powered vehicles and is particularly directed to apparatus for detecting deceleration of such vehicles. It is known that during deceleration there may be an increase of objectionable pollutants discharged into the atmosphere with the exhaust gases of the engine. It has been proposed to detect the state of deceleration by detecting the release of pressure applied to the accelerator pedal for the engine. However, such a device is not necessarily effective in the case of motor vehicles equipped with an automatic transmission, because in such case the vehicle may be decelerated by depressing the brake pedal without releasing the pressure applied on the accelerator pedal.

An object of this invention is to avoid this short-coming by providing a first device for detecting release of pressure applied to the accelerator pedal, and a second device for detecting application of pressure on the brake pedal. In addition, a detector device is employed that is actuated by either or both of the other devices.

Other and more detailed objects and advantages will appear hereinafter.

Figure 1:
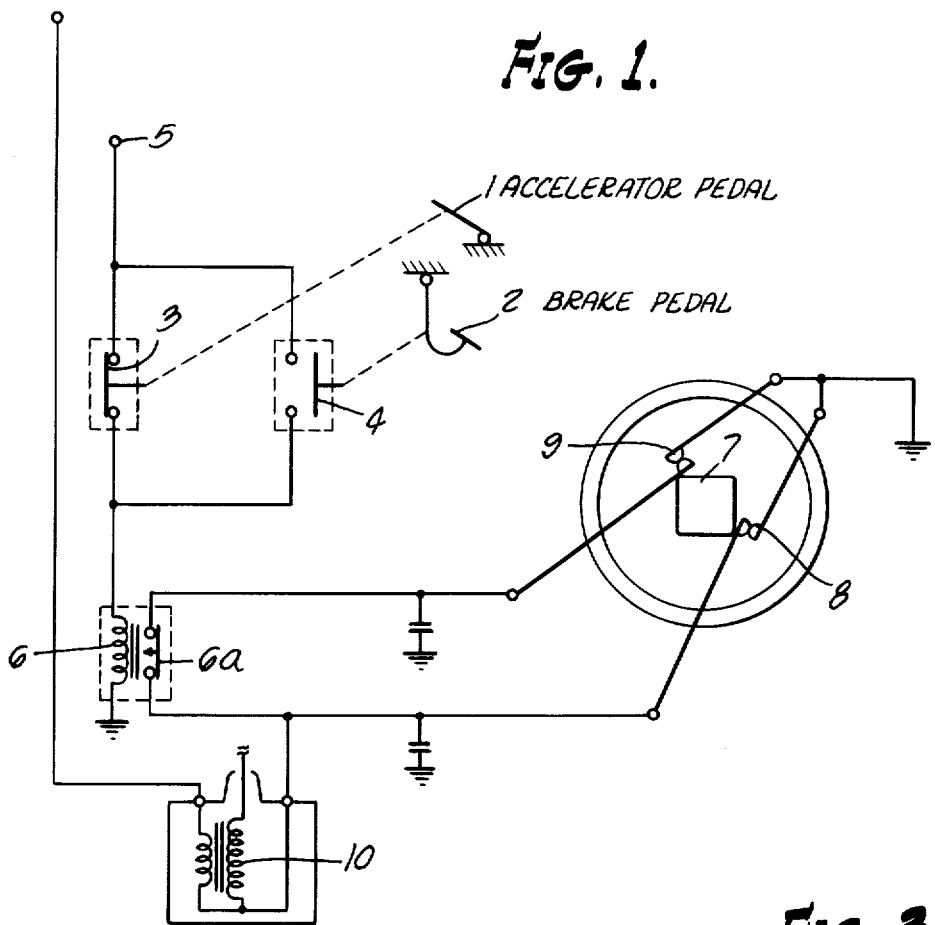
FIG. 1 is a schematic drawing showing a preferred embodiment of this invention.

Referring to the drawings, the accelerator pedal 1 and the brake pedal 2 are both mounted in an engine-powered vehicle. An accelerator switch 3 is provided which closes with the release of pressure applied to the accelerator pedal. A brake switch 4 is also provided which closes with the application of pressure to said brake pedal 2. In FIG. 1, these two switches 3 and 4 are connected in parallel in an electric circuit connected to a power source 5. A relay 6 common to these two switches 3 and 4 is connected to the output side of the circuit to function as a detector device. Thus, when at least one of the two switches 3 and 4 closes, the relay 6 comprising the detector device is energized to close a circuit through the normally-open contact 6a of the relay 6.

Closing of the relay 6 or detector device retards the spark timing of the engine. This is accomplished by means of the point cam 7, the advance contact points 8 and the retard contact point 9. These are connected in parallel to an ignition coil 10, the relay contact 6a being placed in the circuit including the contact point 9. Thus, the relay contact 6a is normally open so that the advance contact points 8 operate alone. However, when the relay contact 6a closes, the retard contact points 9 also operate.

Figure 2:
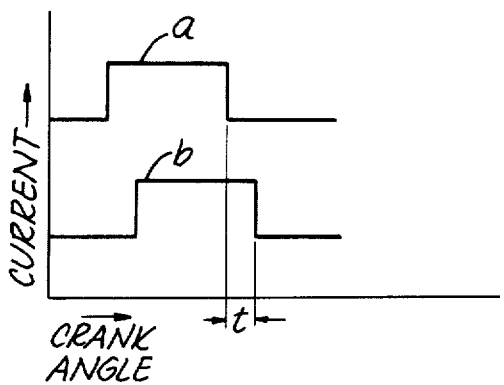
FIG. 2 is a diagram illustrating the operation of the apparatus of FIG. 1.

The graph of FIG. 2 shows the connection and disconnection of current under such conditions. Current flowing through the primary winding of the ignition coil is plotted against crank angle. Normally, only a pulse "a" occurs, but when the relay contact 6a is closed a second pulse "b" is also produced. This action serves to change the ignition timing from advance to retard within the range marked "t".

Figure 3:
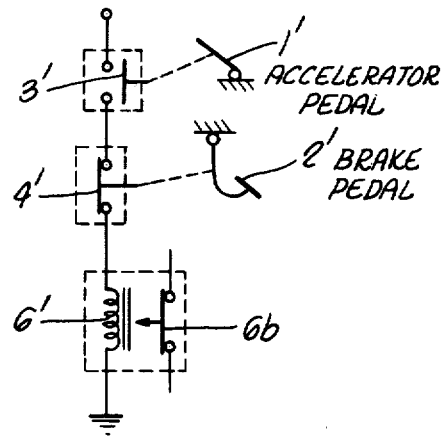
FIG. 3 shows a modified portion of FIG. 1.

As shown in the modification of FIG. 3, the two switches 3' and 4' are connected in series and are constructed to open and close in a relation opposite to that disclosed in FIG. 1. Thus, the switch 3' closes when the accelerator pedal 1' is depressed, and the switch 4' closes when pressure is released from the brake pedal 2'. Assuming that the control circuit of the ignition timing remains the same, the relay contact 6b is required to be of the normally-closed type.

As described above, according to the invention, detection of the state of deceleration is made by both a first device that actuates in response to release of the accelerator pedal and a second device that actuates in response to application of the brake pedal. Particularly, it is made possible to insure detection of the state of deceleration when applied to motor vehicles with automatic transmission, since such motor vehicles may be decelerated by depression of the brake pedal, even though the accelerator pedal is held depressed. A very advantageous result is achieved when the invention is applied, for example, to exhaust purification by control of the ignition timing of the engine.

Having fully described our invention, it is to be understood that we are not to be limited to the details herein set forth, but that our invention is of the full scope of the appended claims.

We claim:

1. A spark ingition timing control apparatus for retarding ignition timing in response to detection of deceleration of an engine-powered vehicle having an automatic transmission and having an accelerator pedal and a brake pedal, said control apparatus comprising, in combination: a first electric switch for detecting release of pressure from the accelerator pedal, a second electric switch for detecting application of pressure to the brake pedal, a detector device connected to said switches and including a relay actuated by at least one of the two switches, an ignition coil, an ignition timing device including an advance contact point and a retard contact point, said contact points being connected in parallel with said ignition coil, said relay being placed in the circuit including said retard contact point, whereby the ignition timing may be changed from advance to retard on deceleration of the vehicle.

2. The combination set forth in claim 1 wherein the first switch is connected to be closed by release of pressure from the accelerator pedal, the second switch is connected to be closed by application of pressure to the brake pedal, the two switches being connected in parallel, the relay being a normally-open relay closed by an output from at least one of the two switches.

3. The combination set forth in claim 1 wherein the first switch is connected to be opened by release of pressure from the accelerator pedal, the second switch is connected to be opened by application of pressure on the brake pedal, the two switches being connected in series, said relay being of a normally-closed relay opened by an output from both of said switches.

* * * * *